United States Patent
Paulson et al.

(10) Patent No.: US 10,960,983 B2
(45) Date of Patent: Mar. 30, 2021

(54) TAILORED ROTOR-BLADE ICE-PROTECTION SYSTEM

(71) Applicant: Bell Helicopter Textron Inc., Fort Worth, TX (US)

(72) Inventors: Jared Mark Paulson, Fort Worth, TX (US); Jeffrey Paul Nissen, Alba, TX (US)

(73) Assignee: Textron Innovations Inc., Providence, RI (US)

( * ) Notice: Subject to any disclaimer, the term of this patent is extended or adjusted under 35 U.S.C. 154(b) by 241 days.

(21) Appl. No.: 15/694,666

(22) Filed: Sep. 1, 2017

(65) Prior Publication Data

US 2019/0071185 A1   Mar. 7, 2019

(51) Int. Cl.
| | |
|---|---|
| *B64D 15/12* | (2006.01) |
| *H05B 3/03* | (2006.01) |
| *H05B 3/20* | (2006.01) |
| *B64C 29/00* | (2006.01) |

(52) U.S. Cl.
CPC .............. *B64D 15/12* (2013.01); *H05B 3/03* (2013.01); *H05B 3/20* (2013.01); *B64C 29/0033* (2013.01)

(58) Field of Classification Search
CPC .......... B64D 15/12; B64D 15/14; F03D 80/40
See application file for complete search history.

(56) References Cited

U.S. PATENT DOCUMENTS

| | | | | |
|---|---|---|---|---|
| 2,757,273 A | * | 7/1956 | Taylor .................. | B64D 15/12 219/537 |
| 2,791,668 A | * | 5/1957 | Cowdrey .............. | B64D 15/12 219/528 |
| 2,992,317 A | | 7/1961 | Hoffman | |
| 3,063,031 A | * | 11/1962 | Edwards ............... | H05B 3/267 338/275 |
| 5,351,918 A | * | 10/1994 | Giamati ................ | B64D 15/12 244/134 D |
| 5,475,204 A | * | 12/1995 | Giamati ................ | B64D 15/12 219/548 |

(Continued)

FOREIGN PATENT DOCUMENTS

| | | |
|---|---|---|
| GB | 553597 A | 5/1943 |
| JP | 2001278195 A | 10/2001 |
| WO | 9915405 A1 | 4/1999 |

OTHER PUBLICATIONS

Exam Report in related European Patent Application No. 17204969.4 dated Aug. 13, 2018, 17 pages.

(Continued)

*Primary Examiner* — Joseph W Sanderson
(74) *Attorney, Agent, or Firm* — Lightfoot & Alford PLLC

(57) ABSTRACT

An ice protection system is configured for a rotor blade having a leading edge along at least a portion of a spanwise length extending between a root portion and a tip portion. The system has an electric spanwise anti-ice heater configured for placement on the leading edge of the blade and a first electric spanwise de-ice heater adjacent the anti-ice heater and having varying chordwise dimensions. The de-ice heater is configured for placement on an upper surface of the blade or a lower surface of the blade. Electrical connectors for each heater are configured for connection near the root portion of the blade to a source of electrical power.

10 Claims, 7 Drawing Sheets

(56) References Cited

U.S. PATENT DOCUMENTS

| | | | | |
|---|---|---|---|---|
| 5,765,779 A * | 6/1998 | Hancock | ................ | B64D 15/12 |
| | | | | 219/202 |
| 5,934,617 A * | 8/1999 | Rutherford | ............ | B64D 15/14 |
| | | | | 244/134 D |
| 5,971,323 A * | 10/1999 | Rauch | .................... | B64D 15/12 |
| | | | | 219/202 |
| 6,194,685 B1 * | 2/2001 | Rutherford | ............ | B64D 15/14 |
| | | | | 219/201 |
| 6,227,492 B1 * | 5/2001 | Schellhase | ............ | B64D 15/12 |
| | | | | 244/134 D |
| 6,338,455 B1 | 1/2002 | Rauch et al. | | |
| 7,211,772 B2 * | 5/2007 | Carpino, II | ............ | B64D 13/08 |
| | | | | 219/385 |
| 7,278,610 B2 * | 10/2007 | Giamati | .................... | B64C 9/24 |
| | | | | 244/134 D |
| 7,291,815 B2 * | 11/2007 | Hubert | .................... | B64D 15/12 |
| | | | | 219/529 |
| 7,546,980 B2 * | 6/2009 | Giamati | .................... | B64C 9/24 |
| | | | | 244/134 D |
| 8,931,740 B2 * | 1/2015 | Nordin | .................... | B64C 3/20 |
| | | | | 244/134 D |
| 9,100,994 B2 * | 8/2015 | Orawetz | .................... | H05B 3/36 |
| 9,193,466 B2 * | 11/2015 | Calder | .................... | B64D 15/14 |
| 9,321,536 B2 * | 4/2016 | Snir | .................... | B64D 15/14 |
| 9,346,550 B2 * | 5/2016 | Gambino | .................... | B64D 15/20 |
| 9,415,875 B2 * | 8/2016 | Stiesdal | .................... | F03D 80/40 |
| 2002/0096506 A1 * | 7/2002 | Moreland | .................... | B64D 15/12 |
| | | | | 219/202 |
| 2004/0245395 A1 * | 12/2004 | Wallace | .................... | B64D 15/12 |
| | | | | 244/134 R |
| 2007/0194179 A1 * | 8/2007 | Giamati | .................... | B64C 9/24 |
| | | | | 244/134 D |
| 2008/0099617 A1 | 5/2008 | Gilmore et al. | | |
| 2009/0134272 A1 * | 5/2009 | Vauchel | .................... | B64D 15/12 |
| | | | | 244/54 |
| 2010/0243811 A1 * | 9/2010 | Stothers | .................... | B64D 15/14 |
| | | | | 244/134 R |
| 2013/0022465 A1 * | 1/2013 | Stiesdal | .................... | F03D 80/40 |
| | | | | 416/95 |
| 2013/0022466 A1 * | 1/2013 | Laurberg | .................... | F03D 80/40 |
| | | | | 416/95 |
| 2013/0043342 A1 * | 2/2013 | Nordin | .................... | B64C 3/20 |
| | | | | 244/1 A |
| 2013/0270253 A1 * | 10/2013 | Botura | .................... | B64D 15/12 |
| | | | | 219/475 |
| 2014/0014640 A1 * | 1/2014 | Calder | .................... | B64D 15/12 |
| | | | | 219/202 |
| 2015/0053663 A1 * | 2/2015 | Sakota | .................... | B64C 1/12 |
| | | | | 219/202 |
| 2015/0204311 A1 * | 7/2015 | Clemens | .................... | F03D 80/40 |
| | | | | 361/118 |
| 2018/0215476 A1 * | 8/2018 | Chee | .................... | C09D 5/24 |

OTHER PUBLICATIONS

Search Report in related European Patent Application No. 17204969.4 dated Jul. 2, 2018, 4 pages.

Exam Report in related European Patent Application No. 17204969.4 dated Jan. 17, 2020, 4 pages.

* cited by examiner

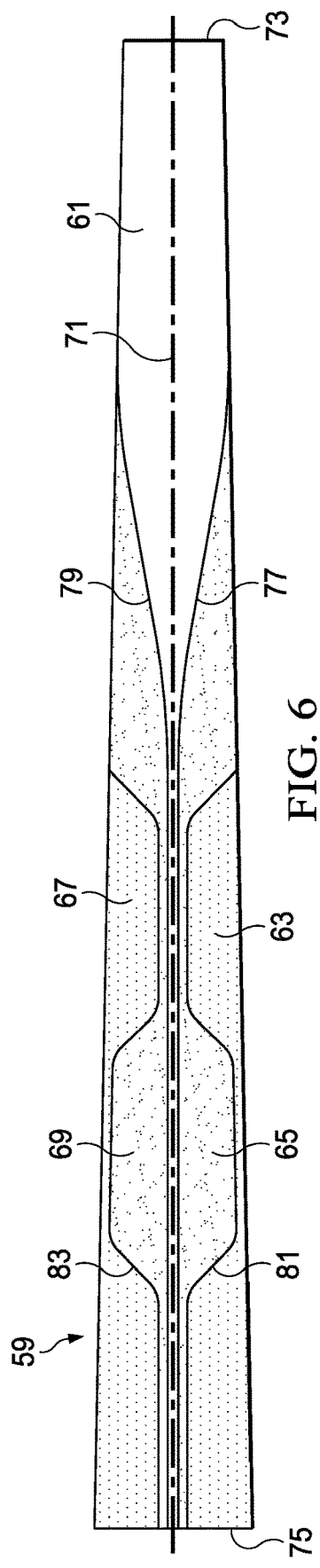
FIG. 6
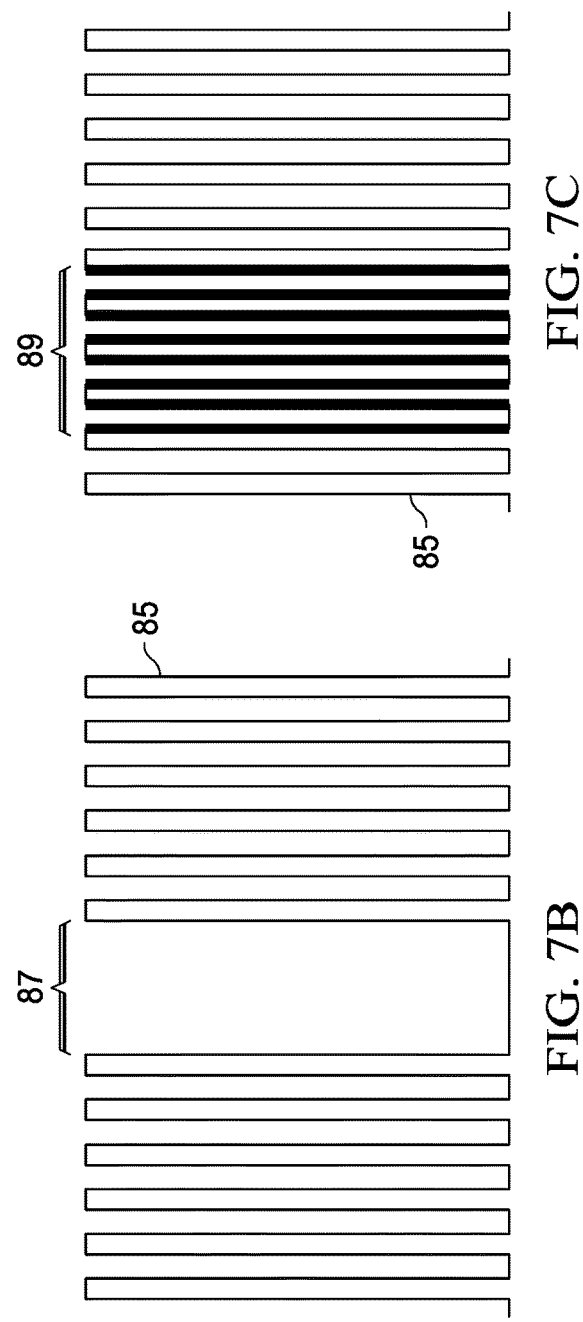
FIG. 7A
FIG. 7B
FIG. 7C

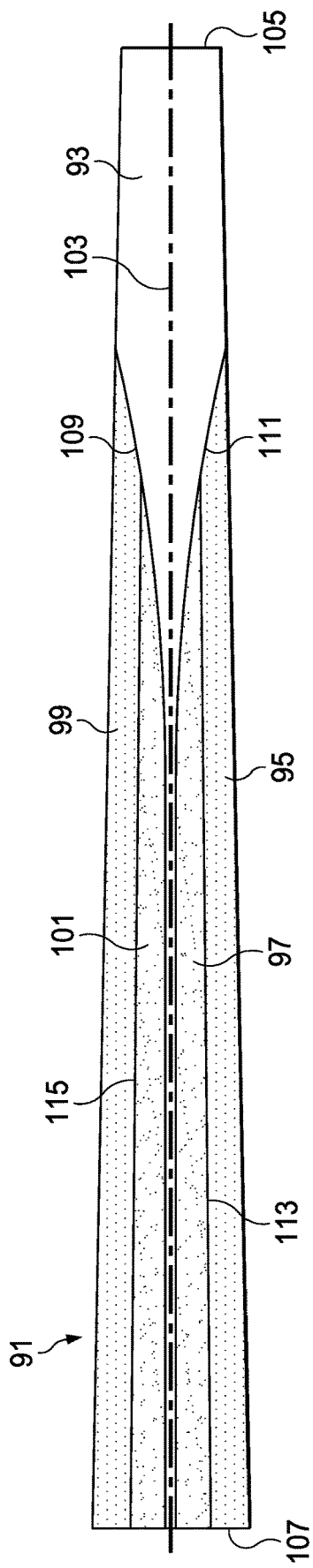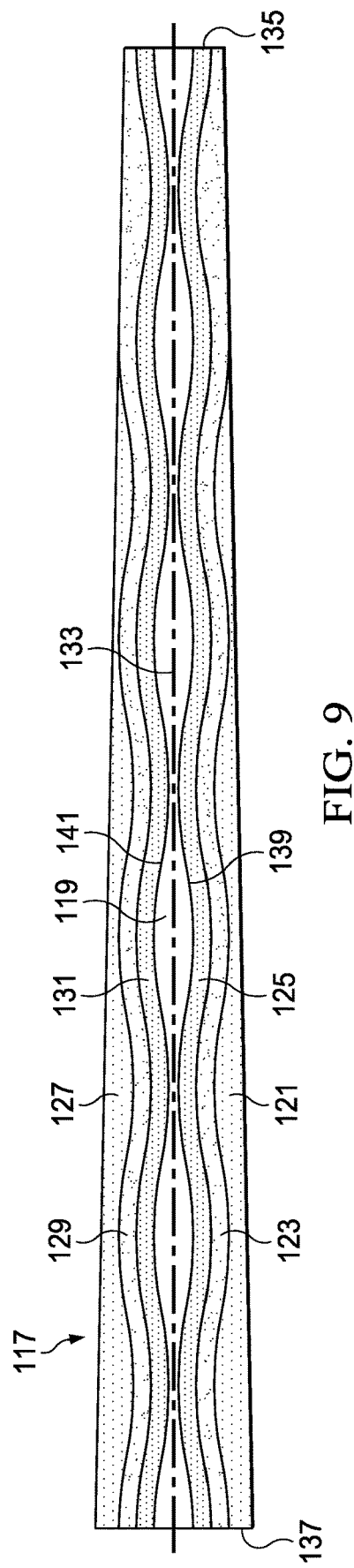
FIG. 8
FIG. 9

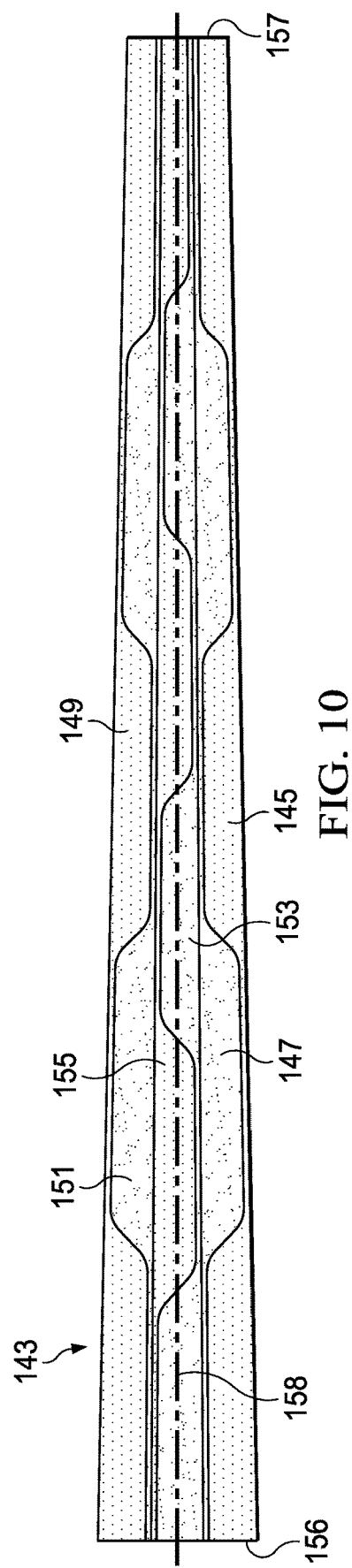
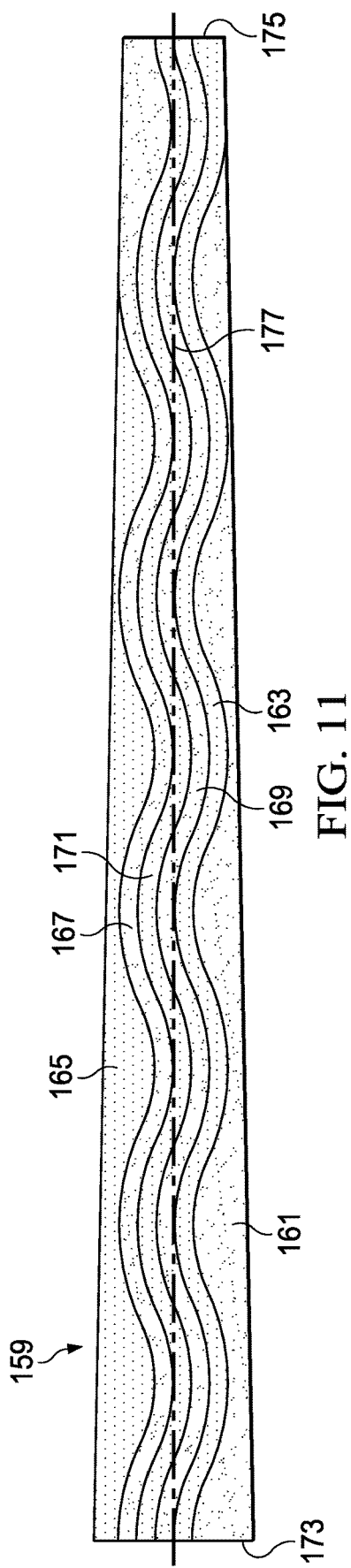
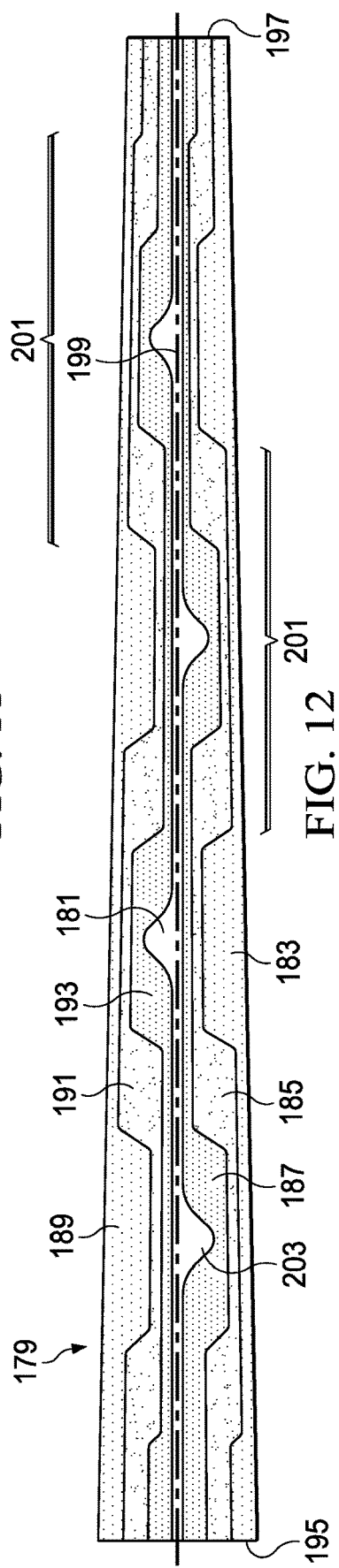

TAILORED ROTOR-BLADE ICE-PROTECTION SYSTEM

BACKGROUND

An ice-protection system (IPS) for an aircraft is used to prevent the buildup of ice on surfaces that require proper airflow across the surface to create lift, such as the wings of fixed-wing aircraft and rotors of rotary-wing aircraft, including both helicopters and tiltrotors. These systems can include one or both of anti-ice components, which are intended to prevent ice formation, and de-ice components, which cause shedding of ice that has already formed. An IPS may have mechanical components, such as inflatable bladders, and/or electrical components, such as heaters.

BRIEF DESCRIPTION OF THE DRAWINGS

FIG. 6 is a 2-D view of the components of the heater blanket of FIG. 5.

FIGS. 7A through 7C are simplified 2-D views of detail of embodiments of the heater blanket of FIG. 5.

FIG. 8 is a 2-D view of the components of another embodiment of the heater blanket of FIG. 5.

FIG. 9 is a 2-D view of the components of another embodiment of the heater blanket of FIG. 5.

FIG. 10 is a 2-D view of the components of another embodiment of the heater blanket of FIG. 5.

FIG. 11 is a 2-D view of the components of another embodiment of the heater blanket of FIG. 5.

FIG. 12 is a 2-D view of the components of another embodiment of the heater blanket of FIG. 5.

DETAILED DESCRIPTION

Figure 1:
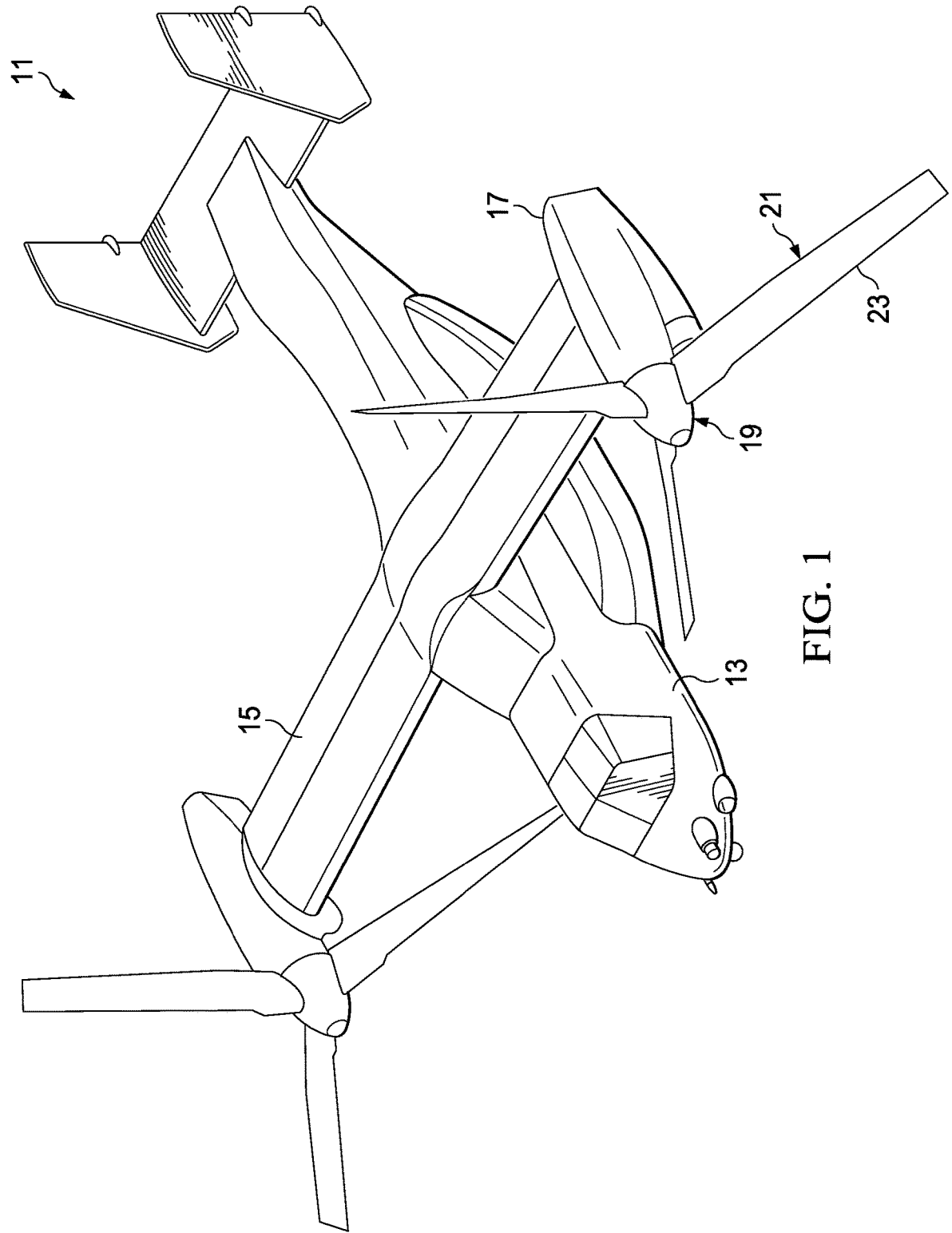
FIG. 1 is an oblique view of a tiltrotor aircraft having a rotor-blade IPS according to this disclosure.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges a rotor-blade ice-protection system (IPS) comprising components tailored to match the pattern of ice formation on a particular rotor blade design. For example, the IPS is tailored based on airfoil shape, twist profile, tip speed, and airflow.

Several factors affect ice accretion on a rotor blade, but a couple of the major contributors include velocity and blade shape. A tailored IPS is one that is not bound by the simple heating zone shapes used for ease in manufacturing of legacy technologies. This new design uses a combination of de-ice and anti-ice heating areas that is optimal for removal and prevention of ice formation based on the unique rotor blade geometric features as well as the performance-critical portions of the blade.

The outboard portion of a rotor blade contributes to performance greater than the inboard portion and also experiences greater rotational velocity, and one embodiment of a tailored IPS includes an anti-ice zone that tapers wider as it extends toward the blade tip. This would prevent the formation of ice at the outboard end of the blade and preserve the most critical area related to blade performance. A larger anti-ice zone that covers more area than legacy configurations may not require more power than existing solutions due to the anti-ice requiring constant low power versus de-ice zones requiring cycling of high power intermittently.

Another embodiment of a tailored IPS has heated zone configurations that are designed as spanwise-extending zones (extending down the length of the blade) that experience the benefits related to chordwise-zone configurations (across the width of the blade). In this design, the spanwise zones are used to reduce the number of potential failures related to electrical connections and electrical bus routing through high-strain areas of the blade. The few connections that are required are all located at the inboard end "root" of the blade with short busses or electrical leads. Through specific geometry and varying resistance, these spanwise zones are designed to act like chordwise zones by alternating heating areas along the span of the blade. This reduces the size of the ice chunk that is shed off of the blade, which is especially critical for the blades of a tiltrotor aircraft that can shed ice toward the fuselage in certain flight conditions.

In addition, the IPS of this disclosure can be more robust and reliable with optional redundancies, such as multiple layers of thin, conductive zones and multiple electrical connections per zone. With multiple connections per zone for redundancy, a failure monitoring system can be used to switch between connections in the case of a failure while maintaining nominal system properties.

Prior methods of rotor-blade ice protection on helicopters have included a configuration of several adjacent electrically heated zones that run in the spanwise direction along the full length of the blade, and power is applied to these zones by electrical connections at the root end of the blade. Helicopter rotor blades are directly above the aircraft, so the high centrifugal force on the blades sheds ice far clear of the aircraft. However, this spanwise zone configuration has been avoided for tiltrotor aircraft due to the concern with shedding large chunks of ice toward the fuselage during de-ice operation while in airplane mode. In the unique airplane mode of flight for a tiltrotor, the tip path plane of the rotor blades is located out to the sides of and perpendicular to the fuselage. For tiltrotor aircraft, spanwise heating zones would be preferred if there were a way to minimize the size of the ice that is shed from the blades.

FIG. 1 illustrates a Bell Boeing V-22 Osprey tiltrotor aircraft 11, comprising fuselage 13 and a transverse wing 15. A nacelle 17 is located at each end of wing 15 and is capable of rotation between a horizontal orientation, as shown, for wing-borne flight in airplane mode and a vertical orientation for rotor-borne flight in helicopter mode. Each nacelle houses an engine for providing torque to an attached rotor 19, each rotor having a plurality of blades 21. To prevent ice formation and to shed ice formed on blades 21, an IPS (described below) is installed on a leading edge 23 of each blade 21 and extends rearward from the leading edge.

A prior-art IPS on tiltrotor aircraft like aircraft 11 has electrically heated zones that run in the chordwise direction around the leading edge of the blade. Multiple chordwise zones are located adjacent to one another along the span of the blade. This chordwise zone configuration requires more electrical connections than a spanwise, helicopter-type configuration due to the increased number of smaller heated zones, which are designed to reduce the size of potential ice chunks that are shed from the blades. Electrical connections are notoriously weak points in a rotor blade that is subjected to high dynamic motion and bending. The concern with electrical connections in this environment is exacerbated on tiltrotor aircraft because the blades see higher strain levels than conventional helicopter blades.

Figure 2:
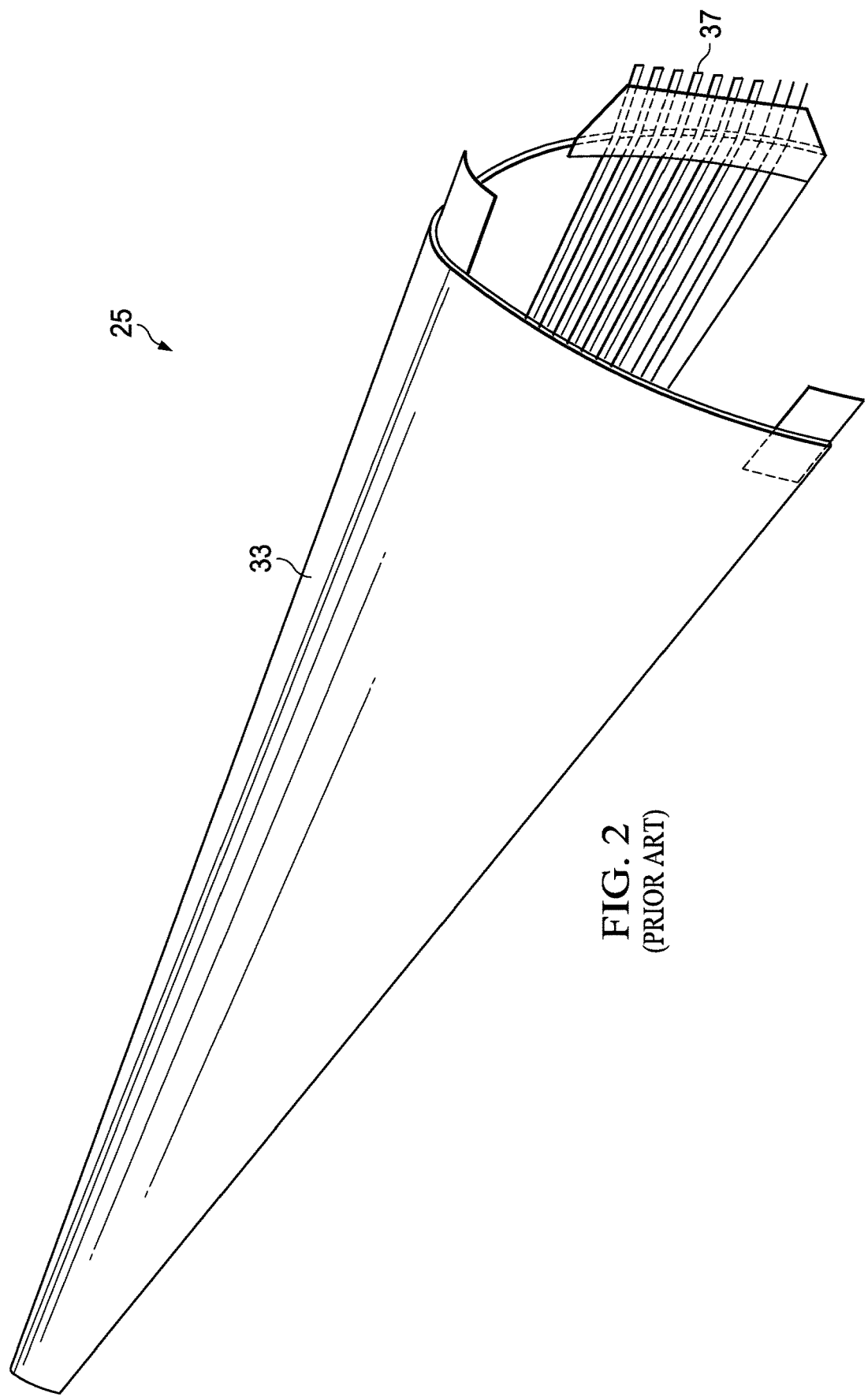
FIG. 2 is an oblique view of a heater blanket of a prior art IPS.
Figure 3:
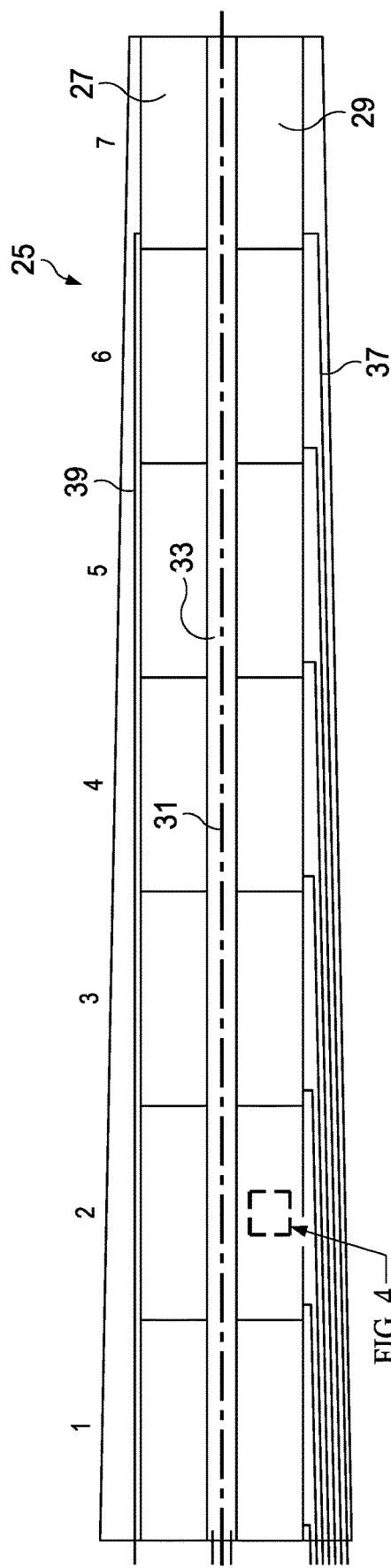
FIG. 3 is a 2-D view of the components of the prior-art heater blanket of FIG. 2.

FIGS. 2 and 3 illustrate a prior-art de-ice heater blanket 25 used in an IPS on V-22 rotor blades and having a chordwise-zone configuration, as described above. FIG. 2 shows the blanket in a shape like that blanket 25 assumes when installed on a leading edge of a blade, whereas FIG. 3 is a 2-D representation of the components of blanket 25. Blanket 25 comprises seven de-ice zones running along the span of blanket 25, which are labeled in the FIG. 2 as zone 1, located near the root of the blade, through zone 7, located near the tip of the blade. Each zone comprises an upper heating element 27 and a lower heating element 29 located on opposite sides of a centerline 31. When blanket 25 is installed on a blade, such as a blade 21 of aircraft 11 of FIG. 1, centerline 31 is located adjacent leading edge 23, and chordwise widths of components of blanket 25 are measured above and below centerline 31 in FIG. 3. In addition to de-ice zones 1 through 7, a central anti-ice zone 33 extends for the entire span of blanket 25 and is generally centered on centerline 31.

Figure 4:
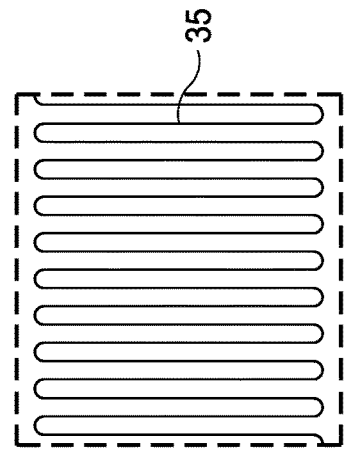
FIG. 4 is a 2-D view of detail of the heater blanket of FIG. 2.

Each heating element 27, 29 is formed as a generally rectangular area, with a wire 35 manually wound in the repeating, sinuous pattern shown in detail in FIG. 4. Wire 35 alternatingly extends toward and away from centerline 31 and perpendicular to the span of blanket 25, and elements 27, 29 typically have relatively consistent sizes and shapes to maintain similar watt densities of elements 27, 29. Elements 27, 29 are electrically connected to the aircraft power system via one of source conductors 37 and a common ground conductor 39. Each source conductor 37 is connected to one lower heating element 29, and ground conductor 39 is connected to each upper heating element 27, thereby allowing for electricity to flow from the root end of conductors 37 to the associated elements 27, 29 of a zone and back along ground conductor 39 to the root end of blanket 25. Soldering is used to form the joints at the connection points of conductors 37, 39 and elements 27, 29.

During operation in icing conditions, constant electrical power is supplied to anti-ice zone 33 to prevent formation of ice along the leading edge of a blade and to reduce size of ice shed from de-ice zones 1 through 7. Time-controlled electrical power is supplied to elements 27, 29 in de-ice zones 1 through 7 to shed ice formed behind anti-ice zone 33.

The design of blanket 25 has the disadvantage of the need to provide power to zones 2 through 7 located outboard on the blade, which requires conductors 37, 39 to be routed behind heating elements 27, 29 along the span of the blade. Thus, conductors 37, 39 are exposed to some of the highest strains on the blade, which limits the options for material and design for the elements that perform this function. With anti-ice zone 33 at the leading edge of the blade and dividing heating elements 27, 29 to avoid overlapping de-ice and anti-ice elements, crossover wires (not shown) are required to be routed underneath anti-ice zone 33 to electrically connect heating elements 27, 29. There is at least one crossover for each chordwise zone, and it is in these areas that there is an increased risk of shorting anti-ice zone 33 to these de-ice crossover wires. The crossovers also make it difficult to meet thickness requirements when forming the blade, which can result in high spots, resistance issues, and shorts within the parent structure. All of the features inherent to the prior-art design result in a product that has reduced reliability and is difficult to manufacture consistently with high quality.

Figure 5:
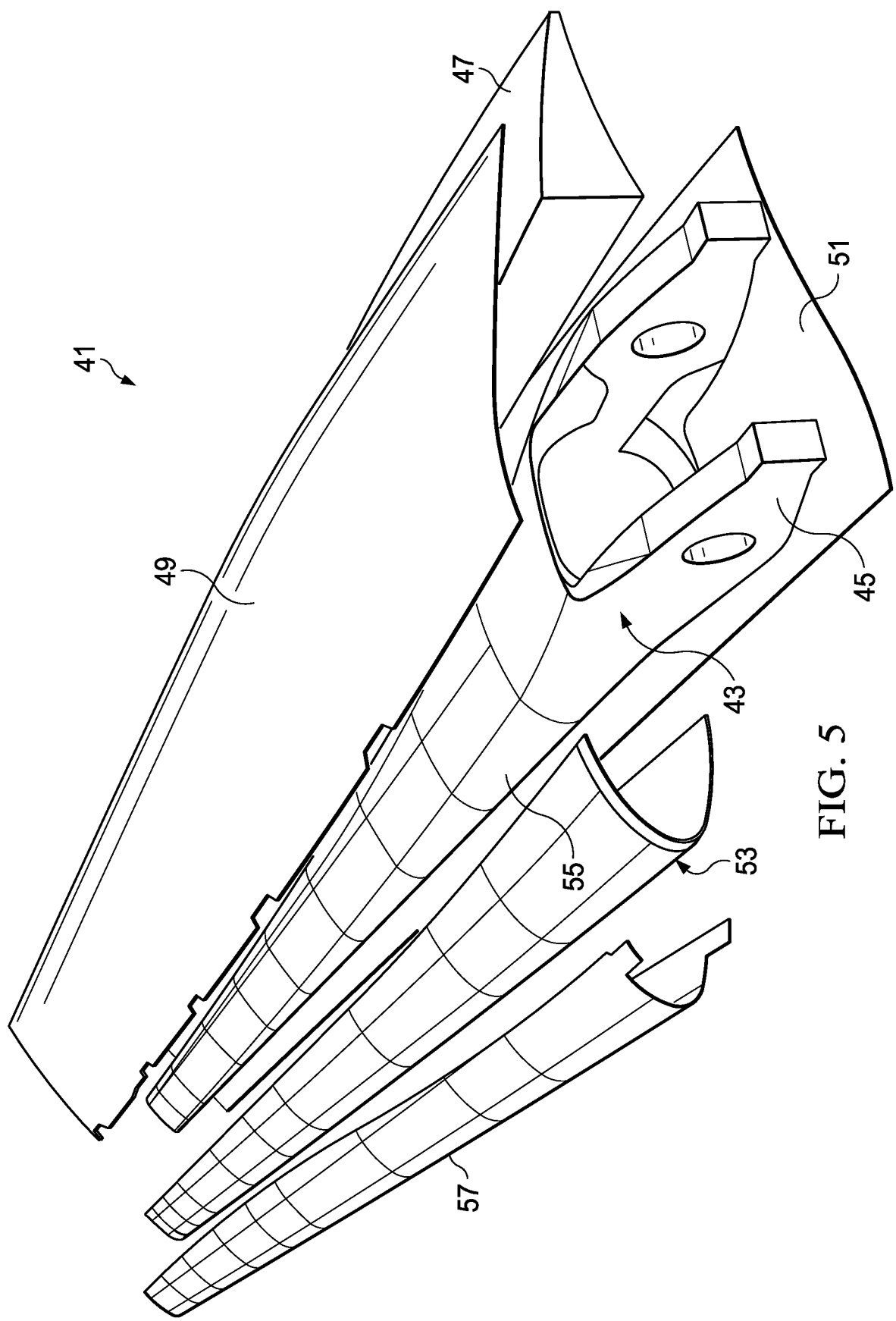
FIG. 5 is an exploded view of a rotor blade configured for use with the aircraft of FIG. 1 and comprising a heater blanket according to this disclosure.

FIGS. 5 through 12 illustrate embodiments of an improved IPS, in which a heater blanket comprises spanwise de-ice and anti-ice zones. The system shown may be used on aircraft 11 of FIG. 1 or in other applications. FIG. 5 shows an exploded oblique view of a blade assembly, and FIGS. 6 and 8 through 12 show 2-D representations of embodiments of the heater blanket.

In each of the designs described below, the de-ice and anti-ice zones are electrically connected to the control system through connections at the root end of the rotor blade, and no electrical busses or connections are located along the span of the blade. This permits the use of several different materials and geometries for bus and connection, as designs are not limited by the high strains seen along the span of the blade. These designs all focus on the leading edge of a rotor blade, where ice is known to accumulate in flight, and elements from each of the embodiments could be combined for an ice-protection solution. The peripheral shape of the entire heated area of the heater blanket would be designed to match the ice accretion pattern as determined by analysis of a specific rotor blade in order to completely remove all ice on the leading edge of the blade.

Referring to FIG. 5, a rotor blade 41 is shown in an exploded view. Blade 41 comprises a rigid inner spar 43, which provides the overall shape and structure of assembled blade 41 and a clevis 45 for attaching blade 41 to a rotor hub (not shown). A trailing-edge core 47 is assembled adjacent spar 43, and an upper skin 49 and a lower skin 51 are bonded to spar 43 and trailing-edge core 47 to form the structure of blade 41. A heater blanket 53 is attached to leading edge 55 of spar 43, and an abrasion strip 57 is installed on blade 41 to protect blanket 53 from damage, such as impacts or erosion. In the embodiment shown, blanket 53 is preferably bonded onto spar 43 and able to be debonded for repair or replacement, though other embodiments may include alternative methods for attaching blanket 53, as described below.

FIGS. 6 and 8 through 12 illustrate embodiments according to this disclosure of anti-ice and/or de-ice zone configurations for heater blanket 53. As in FIG. 3, chordwise widths of components of these blanket configurations are measured above and below a centerline extending spanwise and oriented along the leading edge of the blade when installed. While components of the configurations are shown with specific shapes, it should be noted that they can incorporate one shape or a combination of shapes for any section of a zone, including, for example, wavelike, sawtooth, mazelike, castellated, puzzle-piece edge, and straight.

Referring to FIG. 6, heater blanket configuration 59 comprises anti-ice zone 61, lower de-ice zones 63, 65, and upper de-ice zones 67, 69, each zone 61, 63, 65, 67, 69 comprising a conductive path to form an electric heater. Anti-ice zone 61 is located on the leading edge of the blade along centerline 71 and is shown as extending between tip 73 and root 75 of the blade. As anti-ice zone 61 extends outboard past the blade midspan, edges 77, 79 begin curving away from centerline 71 and toward the trailing edge of the blade on the upper and lower blade surfaces. In the embodiment shown, anti-ice zone 61 takes up the full chordwise width of the heater blanket as it approaches tip 73. This reflects the importance of not allowing ice to form at or near tip 73, especially during rotor-borne flight, as ice on the tip substantially degrades performance of the blade. De-ice zones 63, 65, 67, 69 also extend from root 75, but each terminates along the span of the blade prior to tip 73. Lower zones 63, 65 and upper zones 67, 69 form interlocking castellated patterns on each surface of the blade and are defined by edges 81 and 83, respectively, with zones 63, 65, 67, 69 varying in the chordwise dimension along the span of the blade. These interlocking shapes of varying width cause ice to breakup into smaller pieces during de-icing and shedding than when using prior-art blanket designs.

While shown in a particular configuration, the shape of anti-ice zone 61 can vary from that shown by optimizing the shape to match ice accretion patterns for specific airfoil shapes, blade twist, pitch ranges, and velocities. Edges 77, 79 of anti-ice zone 61 could be smooth in curvature, as shown, or be wavelike or jagged (e.g., a saw-tooth pattern.) Also, a portion of de-ice zones 63, 65, 67, 69 may extend toward the tip and behind anti-ice zone 61 on the upper and lower blade surfaces.

The electrical resistance of the conductive path in anti-ice zone 61 and each de-ice zone 63, 65, 67, 69 is tailored to control alternating heating within the same spanwise zone to minimize the size of ice being shed. Alternating heating means that one de-ice zone heats up in several different areas within the same zone as it extends down the span, and this zone is one of a few de-ice zones that are cycled on and off to heat the blade near the leading edge at different times along the span of the blade. The resistance tailoring is controlled by varying the pattern in the parallel, electrical circuit, by adjusting the cross-sectional area of the conductive element either by varying thickness or width, or by manipulating the amount and dispersion of conductive particles within a carrier, such as in a conductive coating (e.g., carbon nanotube-infused paint). For example, FIGS. 7A through 7C illustrate examples of patterns that can be used in anti-ice zone 61 and de-ice zones 63, 65, 67, 69. In FIG. 7A, a conductor 85 is shown in a repeating, sinuous pattern, in which chordwise portions are approximately the same distance from each other. However, in FIG. 7B, a gap 87 is formed in the repeating pattern of conductor 85 to reduce the watt density of the heater in the location of gap 87, allowing for tailoring of the heating in areas along the blade. FIG. 7C shows another embodiment of conductor 85, a section 89 of which has wider spanwise portions to allow for tailoring of the heating in areas along the blade. Though shown as wider in the spanwise direction, tailoring can also be achieved by, for example, varying the thickness of conductor 85 or by adding additional layers of conductors 85. The ability to vary the watt density of components of a heater blanket configuration applies to all embodiments of this disclosure.

In each of the heated zones, redundancy can be incorporated, either by multiple layers or by multiple connections at the root end of each anti-ice or de-ice zone. A failure monitoring system can be installed to detect and control a connection failure and switch between inner-zone connections while maintaining the nominal result for proper zone function.

FIG. 8 illustrates heater blanket configuration 91, comprising anti-ice zone 93, lower de-ice zones 95, 97, and upper de-ice zones 99, 101, each zone 93, 95, 97, 99, 101 comprising a conductive path to form an electric heater. Anti-ice zone 93 is located along centerline 103 for positioning on the leading edge of the blade and is shown as extending between tip 105 and root 107 of the blade. Like anti-ice zone 61 of configuration 59, as anti-ice zone 93 extends outboard past the blade midspan, edges 109, 111 begin curving away from centerline 103 and toward the trailing edge of the blade on the upper and lower blade surfaces. In the embodiment shown, anti-ice zone 93 takes up the full chordwise width of the heater blanket as it approaches tip 105. De-ice zones 95, 97, 99, 101 also extend from root 107, but each terminates along the span of the blade prior to tip 105. Lower zones 95, 97 and upper zones 99, 101 form adjacent parallel strips on a corresponding surface of the blade and are separated at edges 113, 115, respectively, with zones 95, 97, 99, 101 varying in the chordwise dimension as they terminate at edges 109, 111 at the tip section of anti-ice zone 93. To allow for tailoring of the heating along zones 93, 95, 97, 99, 101, the watt density may be varied, such as by varying the path and/or dimension of conductor(s) therein, as shown and described above in FIGS. 7A through 7C. This will provide for breaking up ice accumulated on zones 95, 97, 99, 101 into smaller pieces during de-icing and shedding than when using prior-art blanket designs.

FIG. 9 illustrates heater blanket configuration 117, comprising anti-ice zone 119 lower de-ice zones 121, 123, 125, and upper de-ice zones 127, 129, 131, each zone 119, 121, 123, 125, 127, 129, 131 comprising a conductive path to form an electric heater. Anti-ice zone 119 is located along centerline 133 for positioning on the leading edge of the blade and is shown as extending between tip 135 and root 137 of the blade. Anti-ice zone 119 has a lower edge 139 and an upper edge 141 that form a sinuous, or wave-like, shape, such that zone 119 has varying chordwise width about centerline 133 throughout the spanwise length of zone 119. Lower de-ice zones 121, 123, 125 and upper de-ice zones 127, 129, 131 have corresponding sinuous shapes and are located adjacent anti-ice zone 119 and each other. In the embodiment shown, de-ice zones 121 and 127 each have a straight trailing edge and terminate prior to tip 135 due to the narrowing of the chord width of configuration 117.

Whereas configurations 59, 91, 117 are shown with an anti-ice zone, the configurations shown in FIGS. 10 and 11 have several de-ice zones and no anti-ice zones.

FIG. 10 illustrates heater blanket configuration 143, comprising lower de-ice zones 145, 147, upper de-ice zones 149, 151, and central de-ice zones 153, 155. Each zone 145, 147, 149, 151, 153, 155 extends spanwise from root 156 to tip 157 and comprises a conductive path to form an electric heater. Each zone 145, 147, 149, 151, 153, 155 has a castellated shape that forms an interlocking pattern with the adjacent zones 145, 147, 149, 151, 153, 155, like those of configuration 59 of FIG. 6. However, central zones 153, 155 are positioned along the leading edge so that portions of zones 153, 155 extend from one side of centerline 158 across to the other side of centerline 158, thereby performing a de-ice function for the leading edge. The interlocking castellated pattern provides for breaking up ice accumulated on zones 145, 147, 149, 151, 153, 155 into smaller pieces during de-icing and shedding than when using prior-art blanket designs.

FIG. 11 illustrates heater blanket configuration 159, comprising lower de-ice zones 161, 163, upper de-ice zones 165, 167, and central de-ice zones 169, 171. Each zone 161, 163, 165, 167, 169, 171 extends spanwise from root 173 toward tip 175 and comprises a conductive path to form an electric heater. Each zone 161, 163, 165, 167, 169, 171 has a sinuous shape that forms an interlocking pattern with the adjacent zones 161, 163, 165, 167, 169, 171, like those of configuration 117 of FIG. 9. However, central zones 169, 171 are positioned along the leading edge so that portions of zones 169, 171 extend from one side of centerline 177 across to the other side of centerline 177, thereby performing a de-ice function for the leading edge. In the embodiment shown, zones 161 and 165 each have a straight trailing edge and terminate prior to tip 175 due to the narrowing of the chord width of configuration 159. The interlocking sinuous patterns provide for breaking up ice accumulated on zones 161, 163, 165, 167, 169, 171 into smaller pieces during de-icing and shedding than when using prior-art blanket designs.

FIG. 12 illustrates another heater blanket configuration 179 that has a tailored anti-ice zone 181 and adjacent de-ice zones 183, 185, 187, 189, 191, 193. Each zone 181, 183, 185, 187, 189, 191, 193 extends spanwise from root 195 to tip 197 and comprises a conductive path to form an electric heater. Each de-ice zone 183, 185, 187, 189, 191, 193 has a castellated shape that forms a stacked interlocking pattern with the adjacent zones 183, 185, 187, 189, 191, 193, such that portions extending toward or away from centerline 199 are centered on each other to form alternating stacked groups 201. Anti-ice zone 181 is positioned along the leading edge and has bulging portions 203 that extend away from centerline 199 and are centered within each stacked group 201. The stacked interlocking patterns provide for breaking up ice accumulated on zones 181, 183, 185, 187, 189, 191, 193 into smaller pieces during de-icing and shedding than when using prior-art blanket designs.

While described herein as being used for tiltrotor aircraft, it should be noted that the IPS and components described above can be used for rotor blades in all appropriate applications, including propellers for fixed-wing aircraft, all manner of rotor-borne aircraft, unmanned drones, and wind-turbine blades.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An ice protection system for a rotor blade, the blade having a leading edge along at least a portion of a spanwise length extending between a root portion and a tip portion, the system comprising:
   an electric spanwise anti-ice heater configured for continuous heating during operation and for placement on the leading edge of the blade, the anti-ice heater extending continuously from the tip portion to the root portion and having opposing edges defining a chordwise width of the anti-ice heater, the edges curving away from a centerline of the anti-ice heater outboard of a midspan of the blade:
   a first electric spanwise de-ice heater adjacent the anti-ice heater and having varying chordwise dimensions, the de-ice heater being configured for intermittent heating during operation and for placement on an upper surface of the blade or a lower surface of the blade; and
   electrical connectors for each heater, the connectors being configured for connection near the root portion of the blade to a source of electrical power.

2. The system of claim 1, further comprising:
   a second electric spanwise de-ice heater having varying chordwise dimensions and configured for placement on an upper surface of the blade or a lower surface of the blade;
   wherein the second de-ice heater is adjacent the first de-ice heater.

3. The system of claim 2, wherein adjacent edges of the de-ice heaters form an interlocking pattern.

4. The system of claim 3, wherein the interlocking pattern is sinuous.

5. The system of claim 3, wherein the interlocking pattern is castellated.

6. The system of claim 1, wherein a watt density of at least one of the heaters varies along its spanwise length.

7. An aircraft, comprising:
   at least one rotor, each rotor having a plurality of blades, each blade having a leading edge along at least a portion of a spanwise length extending between a root portion and a tip portion; and
   a heater blanket for each blade, comprising:
      an electric spanwise anti-ice heater configured for continuous heating during operation and for placement on the leading edge of the blade, the anti-ice heater extending continuously from the tip portion to the root portion and having opposing edges defining a chordwise width of the anti-ice heater, the edges curving away from a centerline of the anti-ice heater outboard of a midspan of the blade:
   a first electric spanwise de-ice heater adjacent the anti-ice heater and having varying chordwise dimensions, the de-ice heater being configured for intermittent heating during operation and for placement on an upper surface of the blade or a lower surface of the blade;

a second electric spanwise de-ice heater adjacent the first de-ice heater and having varying chordwise dimensions, the de-ice heater being configured for intermittent heating during operation and for placement on the same surface of the blade as the first de-ice heater; and electrical connectors for each heater, the connectors being configured for connection near the root portion of the blade to a source of electrical power.

8. The aircraft of claim 7, wherein adjacent edges of the de-ice heaters form an interlocking pattern.

9. The aircraft of claim 8, wherein the interlocking pattern is sinuous.

10. The aircraft of claim 8, wherein the interlocking pattern is castellated.

\* \* \* \* \*